United States Patent [19]

Doerr

[11] Patent Number: 4,824,930

[45] Date of Patent: Apr. 25, 1989

[54] POLYMERIZATION PROCESS FOR THE PREPARATION OF POLY(BUTYLENE TEREPHTHALATE)

[75] Inventor: Marvin L. Doerr, Pineville, N.C.

[73] Assignee: Celanese Fibers, Inc., New York, N.Y.

[21] Appl. No.: 135,174

[22] Filed: Dec. 18, 1987

[51] Int. Cl.⁴ .............................................. C08G 63/40
[52] U.S. Cl. ..................................... 528/272; 528/279; 528/308; 528/308.6
[58] Field of Search ............. 528/272, 279, 308, 308.6

[56] References Cited

U.S. PATENT DOCUMENTS

| | | | |
|---|---|---|---|
| 3,487,049 | 12/1969 | Busot | 526/65 |
| 3,635,899 | 1/1972 | Doerr et al. | 528/309.1 |
| 3,859,257 | 1/1975 | Schade et al. | 526/71 |
| 4,056,514 | 11/1977 | Strehler et al. | 528/274 |
| 4,066,627 | 1/1978 | Borman et al. | 528/279 |
| 4,239,882 | 12/1980 | Kimura et al. | 528/209 |
| 4,289,895 | 9/1981 | Burkhardt et al. | 560/92 |
| 4,499,261 | 2/1985 | Heinze et al. | 528/279 |
| 4,654,413 | 3/1987 | Takahashi | 528/274 |

Primary Examiner—John Kight
Assistant Examiner—Samuel A. Acquah
Attorney, Agent, or Firm—Forrest D. Stine

[57] ABSTRACT

A process is disclosed for the preparation of polymeric butanediol ester of terephthalic acid by means of ester interchange process having improved rates of polymerization to produce polyesters having improved color. The process employs the neat addition of terephthalic acid on completion of the ester interchange reaction and maintains the ratio of glycol to dimethyl terephthalate in the ratio of not more than 1.3 to 1. Preferably the process is conducted with titanium containing catalysts and has a polymerization rate greater than 700 deciliters per hour.

10 Claims, 5 Drawing Sheets

POLYMERIZATION PROCESS FOR THE PREPARATION OF POLY(BUTYLENE TEREPHTHALATE)

This invention relates to the preparation of polymeric 1,4-butanediol esters of terephthalic acid. More particularly this invention relates to an ester interchange process having improved rates of polymerization to produce polyesters having improved color.

Polyester polymers may be prepared by two different mechanisms, polycondensation and polyesterification. Because both carboxyl end groups and hydroxyl end groups are present in polyester monomer manufactured from terephthalic acid and a diol, both mechanisms of polymerization proceed simultaneously. However, in monomer manufactured from dimethyl terephthalate and a diol, there are essentially no carboxyl end groups and the polyesterification path to polymer, kinetically four times as fast as polycondensation, is closed to dimethyl terephthalate-based polyesters. Introducing carboxyl end groups to dimethyl terephthalate-based monomer, allows both reaction pathways to be available for polymerization. This results, all other features remaining constant, in improved productivity.

Due to the commercial importance of polyethylene terephthalate, the prior art is primarily concerned with ester interchange processes involving as reactants dimethyl terephthalate and ethylene glycol. Because of the low cost of ethylene glycol, workers in the prior art have not been greatly concerned with minimizing the mole ratio of glycol to dimethyl terephthalate. Representative of prior art, polyethylene terephthalate ester interchange processes employing terephthalic acid addition to a dimethyl terephthalate trans esterification monomer are U.S. Pat. No. 3,487,049, U.S. Pat. No. 4,066,627, U.S. Pat. No. 4,238,593, and Japanese kokai No. sho 48 [1973]-7090 assigned to Asahi Chemical Industry Company, Ltd.

U.S. Pat. No. 3,487,049 discloses a continuous process for producing fiber-forming linear polyester from a dimethyl terephthalate and ethylene glycol. The process employs a series of reaction vessels to produce monomer by means of an ester interchange reaction followed by polymerization. By adding small amounts of finely divided terephthalic acid intermediate the ester interchange and polymerization reaction an increase in the degree of polymerization is obtained together with a color improvement in the polymer end product. The terephthalic acid is added in the form of a glycol slurry in amount sufficient to provide from 0.01% to 4% by weight of terephthalic acid based upon the weight of polymer produced. Reduction in the mole ratio of a glycol to dimethylene terephthalate together with an increase in rate of reaction is not disclosed nor is the patent concerned with the preparation of polyesters other than polyethylene terephthalate.

U.S. Pat. No. 4,238,593 discloses a solid-state polymerization process wherein a balance of carboxyl end groups and hydroxyl end groups is employed to maximize reactivity. In order to obtain this balance, terephthalic acid may be added to dimethyl terephthalate monomer. The terephthalic acid is added in the form of a glycol slurry.

Japanese kokai Pat. No. sho 48 [1973]-7090 assigned to Asahi Chemical Industry Company, Ltd. discloses the preparation of polyesters by means of a continuous ester interchange reaction between a dialkyl terephthalate and an alkylene glycol followed by a continuous polycondensation reaction wherein terephthalic acid is added at the end of the ester interchange reaction. The thrust of the invention is to inhibit side reaction products. To achieve this effect, terephthalic acid in an ethylene glycol slurry is continuously added in an amount of 5 to 30 mole percent relative to the dialkyl terephthalate used as a starting material at the second prepolycondensation stage among the above-mentioned reaction stages. With regard to the ratio of ethylene glycol to dialkyl terephthalate a few beneficial effects are obtained in the ratio of ethylene glycol to dialkyl terethalate of from 2 to 2.2.

Workers of the prior art have also attempted to shorten the reaction time in poly(1,4-butylene terephthalate)ester interchange processes. Representative of prior art poly(butylene terephthalate)ester interchange processes employing terephthalic acid are U.S. Pat. Nos. 3,635,899 and 4,066,627.

U.S. Pat. No. 3,635,899 discloses the preparation of polymeric 1,4-butanediol esters of terephthalic acid in a process wherein the formation of undesired cyclic byproducts is minimized by means of a process employing relative short ester interchange reaction time wherein neither large excesses of glycol nor high temperatures are used (See U.S. Pat. No. 3,635,899). It is known that the use of a high mole ratio and/or high reaction temperatures is undesirable when reacting a 1,4-butanediol with dimethyl terephthalate, since 1,4-butanediol undergoes very rapid side reactions involving the formation of stable ring compounds. This reaction is illustrated below.

1,4-butanediol          Tetrahydrofuran

The diol/dimethylterephthalate ratio employed in the U.S. Pat. No. 3,635,899 while low is not reacted rapidly enough to prevent the formation of undesired byproducts. More specifically, the patented process results in the formation of undesired byproduct to a degree sufficient to reduce color quality.

U.S. Pat. No. 4,066,627 discloses the preparation of poly(1,4-butylene terephthalate) in a shortened reaction time by reacting excess butanediol with dimethyl terephthalate and terephthalic acid. The high mole ratio excess of butanediol is from 110 to 500 mole percent based on the mixture, with the initial reaction charge containing dimethyl terephthalate, terephthalic acid and 1,4-butanediol. Excess 1,4-butanediol and methanol and water byproducts are removed until a high molecular weight resin is formed. The process in addition to employing uneconomically high mole ratios of 1,4-butanediol is difficult to operate in that in removing water, dimethyl terephthalate is steam distilled and plugs condensers. Also, the presence of terephthalic acid during an ester interchange reaction causes the terephthalic acid to form insoluble salts with the ester interchange catalyst making the ester interchange reaction difficult.

It is therefore an object of this invention to provide an accelerated rate of reaction, low-mole ratio process for the ester interchange preparation of a terephthalic acid ester of 1,4-butanediol.

It is another object of this invention to provide an accelerated process for the preparation of polymeric 1,4-butanediol esters of terephthalic acid having improved color quality.

In accordance with this invention it has now been discovered that in a process for the preparation of poly-(1,4-butylene terephthalate) by feeding dimethyl terephthalate and 1,4-butanediol components with catalysts to an ester interchange reactor and reacting to form monomer, that the neat addition of terephthalic acid upon the completion of the ester interchange reaction followed by polymerization of the terephthalic acid-containing monomer accelerates the reaction rate and allows the ratio of glycol to dimethyl terephthalate to be maintained in the ratio of not more than 1.3 to 1. Terephthalic acid is preferably added in amounts of from 7 to 12 percent by weight based on the weight of dimethyl terephthalate. Preferably, terephthalic acid is added in amounts of from 9 to 11 percent based on the weight of dimethyl terephthalate. The resultant polymer has luminance values (L*) of more than 91.5 and yellow-blue values (b*) of less than 3 at an intrinsic viscosity of 0.85.

L* and b* values as set forth herein quantify the color or appearance of polymer chip. These values are obtained by measuring the spectrum of visible light arising from the surface of the chip by the reflection of incident illumination. An MS2000 color instrument manufactured by MacBeth Division of Kollmorgen, Inc. of Newburgh, N.Y., provides the means to controllably illuminate and record the reflectance spectra of the polymer chip. Appropriate treatment of the data then provides for the numerical description. Polymer chip samples for analysis in the color instrument are prepared by grinding approximately 25 grams of chip in a Wiley Mill equipped with a 2 mm screen. The compression cell of the color instrument is then loaded approximately half full with the milled polymer sample backed with tissue and then closed. The instrument is then pressurized to 80 pounds per square inch and appropriate Y and Z values read while holding the top of the compression cell against the instrument face. L* and b* values are then calculated from the following equations:

$$L^* = 25\left(100\frac{Y}{Y_o}\right)^{\frac{1}{3}} - 16$$

$$b^* = 200\left[\left(\frac{Y}{Y_o}\right)^{\frac{1}{3}} - \left(\frac{Z}{Z_o}\right)^{\frac{1}{3}}\right]$$

where $Y_o = 100$ and $Z_o = 118.2246$

L* values are a measure of luminance, the higher value being more luminant. b* values are a measure of yellow-blue values with the higher value being yellower and hence less desirable. A more detailed discussion of procedures for the use of instrumentation in obtaining color values may be found in Billmeyer and Saltzman, *Principles of Color Technology*, John Wiley and Sons, New York, N.Y., 1967.

The ester-interchange and polycondensation catalysts of the prior art may be used in the process of this invention. Although two separate catalysts may be used, one for ester interchange and one for polycondensation, it is preferred to use one catalyst for both functions and most preferably a titanium-containing catalyst. Thus, e.g., some of the many catalysts which can be used in the process of this invention include those described in U.S. Pat. Nos. 2,534,028; 2,650,213; 2,850,483; 2,892,815; 2,937,160; 2,998,412; 3,110,693; 3,142,773 and 3,385,830. This list is merely exemplary, and virtually any good poly(1,4-butylene terephthalate)ester interchange and polycondensation catalyst will work in the process of the instant invention.

The process of this invention works especially well and yield the best L* and b* values with titanium-containing catalysts such as those described in U.S. Pat. Nos. 2,720,502; 2,729,618; 2,882,348; 2,906,307, 3,047,515; 3,056,818; 3,067,178; 3,068,204; 3,075,952 and the like. The most preferred catalyst for purposes of this invention is tetrabutyl titanate.

The process of the instant invention wherein increased reaction rate is obtained by neat terephthalic acid addition to dimethyl terephthalate based monomers, produces in addition to the economic advantage, and color improvement, another unexpected result. Addition of terephthalic acid gives more polymer mass without the addition of more diol. The terephthalic acid reacts very rapidly with the free excess diol and/or the esterified diol (in the form of monomer hydroxy end groups) and is converted to monomer mass. The net effect is a true reduction in the process mole ratio. There is no other known means of reducing the mole ratio without losing reactivity. The diols in excess of 1/1 mole ratio, must be recovered and purified by reuse. Since the added terephthalic acid results in a substantially reduced mole ratio, then the diol recovery volumes and costs are correspondingly reduced, as shown in Table 1.

BRIEF DESCRIPTION OF THE DRAWINGS

A better understanding of the aforementioned unexpected results may be had from the examples and from the drawings wherein.

The following specific examples are given for purposes of illustration and should not be deemed as limiting the spirit or scope of this invention:

EXAMPLE 1

The following example which does not employ the use of terephthalic acid is conducted as follows: 5.6 moles of 1,4-butanediol, 4.0 moles of dimethyl terephthalate and 150 parts per million Tyzor ® TBT (based on polymer) ester interchange catalyst are charged to a stainless steel reactor equipped with a thermocouple, stirring motor and rectification column thereby forming a reaction mixture wherein the diol/dimethyl terephthalate mole ratio is 1.40. This reaction mixture, at atmospheric pressure, is stirred as the ester interchange reaction is started at about 150° C. and completed at temperature of about 200° C. over a period of 160 minutes during which time distillates are collected. The rectification column is then replaced by a total condenser, 270 ppm Tyzor ® TBT (based on polymer) titanium polycondensation catalyst is added, and the temperature of the reaction mixture raised to 251° C. As the temperature of the reaction mixture reaches 205° C., a vacuum of about 0.2 mm of mercury is imposed over a period of 45 minutes while heating continues. Polymerization, at 251° C., is continued for a period of 65 minutes to a melt viscosity that corresponds to a solution IV of about 0.8. Polymer properties are given in Table 1.

EXAMPLES 2-5

Procedure of Example 1 is followed with the exception that varying amounts of terephthalic acid are added after the ester interchange reaction. Polymerizations are taken to melt viscosity. The results being set forth in Table 1. In all cases terephthalic acid is added neat, that is to say, added without a carrier such as 1,4-butanediol.

TABLE 1

| | TA Addition Neat - No Carrier | | | | |
|---|---|---|---|---|---|
| Identity | Example 1 | Example 2 | Example 3 | Example 4 | Example 5 |
| Wt. % Terephthalic Acid Added[a] | 0 | 5.0 | 9.0 | 10.0 | 12.0 |
| Polymerization Time in Hours | 1.08 | 1.17 | 1.08 | 0.97 | 1.08 |
| IV, dl/g | 0.80 | 0.85 | 0.85 | 0.85 | 0.83 |
| Carboxyl End Groups, ueq/g | 13 | 23 | 9 | 8 | 7 |
| Color: | | | | | |
| L* | 91.9 | 92.5 | 92.0 | 91.6 | 92.2 |
| b* | 3.0 | 2.5 | 3.0 | 3.1 | 1.9 |
| Batch Mass, g | 881 | 933 | 974 | 984 | 1005 |
| Poly Rate, dl/hr[b] | 652 | 672 | 760 | 866 | 774 |
| Effective MR | 1.40 | 1.33 | 1.27 | 1.26 | 1.23 |
| Recovered BDO Reduction, % | 0 | 17.4 | 32.6 | 35.4 | 42.4 |

[a]Based dimethyl terephthalate weight.
[b]Poly Rate in dl/hr = IV (in dl/g) divided by poly time (in hours) multiplied by batch mass (in grams).

By "IV" or "intrinsic viscosity" is meant the reduced viscosity of the polymer at zero concentration, which may be determined by measuring the flow times of a polymer solution after successive dilutions with fresh solvent, calculating the reduced viscosities, and extrapolating a plot of the reduced viscosities against concentration to zero concentration. The reduced viscosity is obtained from the expression:

$$\left(\frac{\text{Flow time of polymer solution}}{\text{Flow time of solvent}} - 1\right) \times \frac{1}{c}$$

where c is the concentration expressed as grams of polymer per 100 ml of solvent. As used inere, the intrinsic viscosity was measured at 25° C., using orthochlorophenol as a solvent in a modified Ostwald viscometer.

Figure 1:
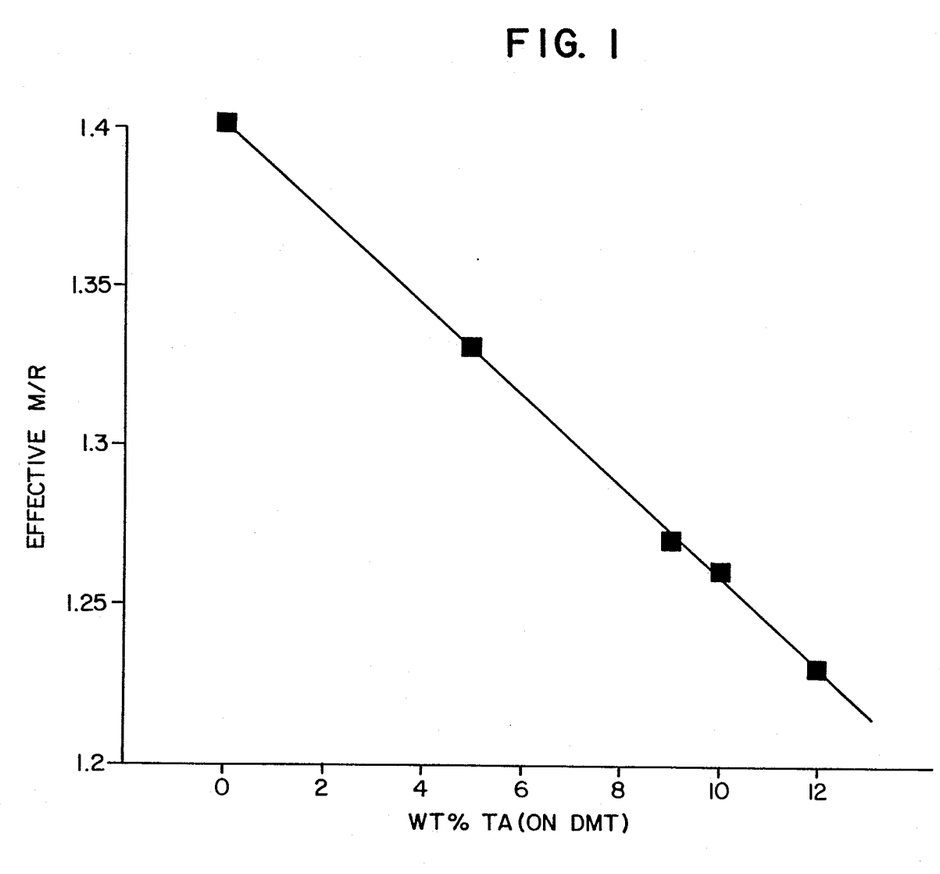
FIG. 1 is a graph plotting effective mole ratio of 1,4-butanediol to dimethyl terephthalate against weight percent of terephthalic acid. (An initial mole ratio of 1.4 was chosen because it is a common, commercial mole ratio.)

A graphic representation of the effective 1,4-butanediol to dimethyl terephthalate mole ratio versus weight percent of terephthalic acid as taken from the data of Table 1 may be seen in FIG. 1 of the drawings. An initial mole ratio of 1.4 was chosen because it is a common commercial mole ratio. As can be seen, the effective mole ratio decreases as the weight percent of terephthalic acid based on dimethyl terephthalate increases.

Figure 2:
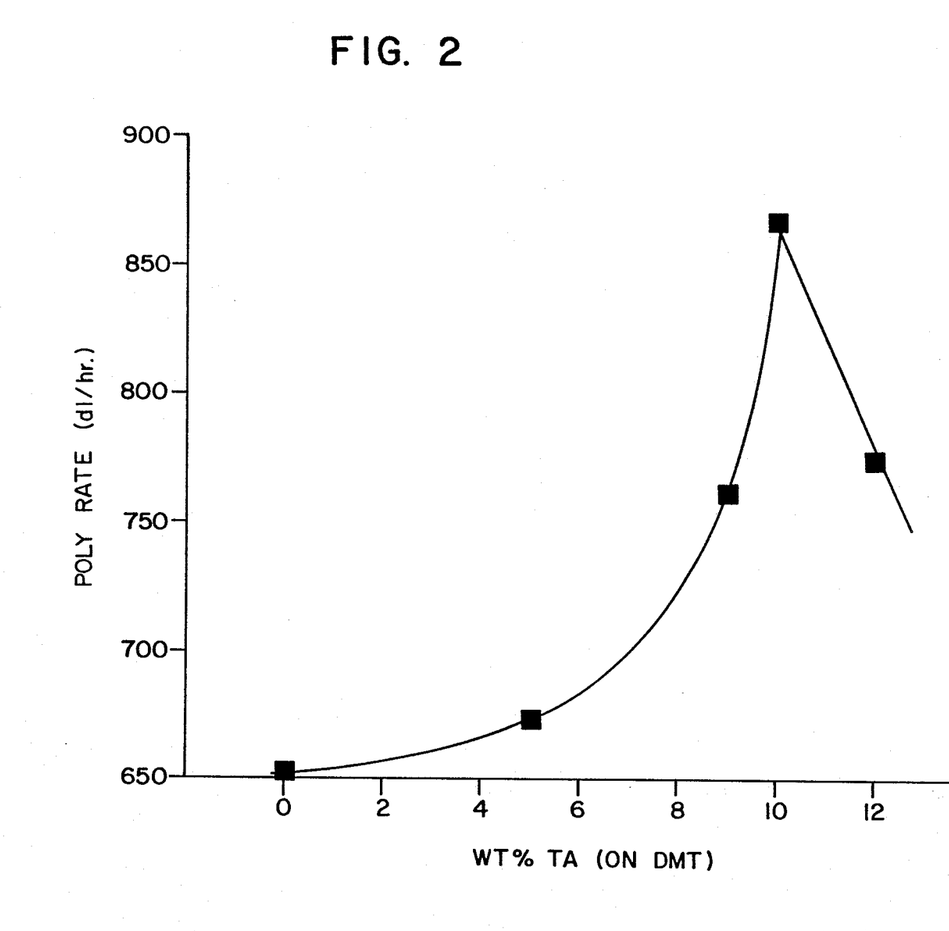
FIG. 2 is a graph plotting polymerization rate against weight percent of terephthalic acid.

A graphic representation of an additional portion of the data of Table 1 may also be seen in FIG. 2 of the drawings wherein polymerization rate in deciliters per hour is plotted against weight percent of terephthalic acid on dimethyl terephthalate. As can be seen, the polymerization rate peaks at about 10 weight percent terephthalic acid on dimethyl terephthalate.

EXAMPLE 6

The process of Example 4 is repeated except that no terephthalic acid is added. The mole ratio of Example 4 and more specifically a mole ratio of 1.26 is maintained. The data of this Example 6 in comparison with the data of Example 4 are set forth in Table 2 hereinafter.

TABLE 2

| | Example 6 | Example 4 |
|---|---|---|
| Wt % Terephthalic Acid Added | 0 | 10.0 |
| Polymerization Time in Hours | 1.00 | 0.97 |
| IV, dl/g | 0.886 | 0.85 |
| Carboxyl End Groups, µeq/g | 14 | 8 |
| Color: | | |
| L* | 91.3 | 91.6 |
| b* | 5.3 | 3.1 |
| Batch Mass, g | 881 | 984 |
| Poly Rate, dl/hr | 781 | 866 |
| Effective Mole Ratio | 1.26 | 1.26 |

As can be seen even though a low mole ratio of 1.26 is maintained in both Example 4 and Example 6, the terephthalic acid addition example as represented by Example 4 exhibits improved results in terms of polymerization rate and polymer yellowness (b*).

EXAMPLES 7 AND 8

Are identical to Example 1 with the exception that terephthalic acid in 1,4-butanediol carrier (70/30 by weight) is added after the completion of the ester interchange reaction. Other variations from the control are as reported in the following table designated as Table 3. It can be seen that the improvements of this invention is polymer color and rate are both negated by the use of 1,4-butanediol as a TA carrier.

TABLE 3

| | TA Addition in 1,4-Butanediol Carrier | | |
|---|---|---|---|
| Identity | Example 1 | Example 7 | Example 8 |
| Wt % Terephthalic Acid Added[a] | 0 | 7.0 | 10.0 |
| Polymerization Time in Hours | 1.08 | 1.20 | 1.33 |
| IV, dl/g | 0.80 | 0.83 | 0.89 |
| Carboxyl End Groups, µeq/g | 13 | 9 | 11 |
| Color: | | | |
| L* | 92.0 | 91.8 | 91.0 |
| b* | 3.0 | 2.9 | 4.2 |
| Batch Mass, g | 881 | 953 | 984 |
| Poly Rate, dl/hr[b] | 652 | 661 | 655 |
| Effective MR | 1.40 | 1.36 | 1.34 |
| Recovered BDO Reduction, % | 0 | 9.0 | 14.6 |

[a]Based on dimethyl therephthalate weight.
[b]Poly Rate in dl/hr = IV (in dl/g) divided by poly time (in hours) multiplied by batch mass (in grams).

Figure 3:
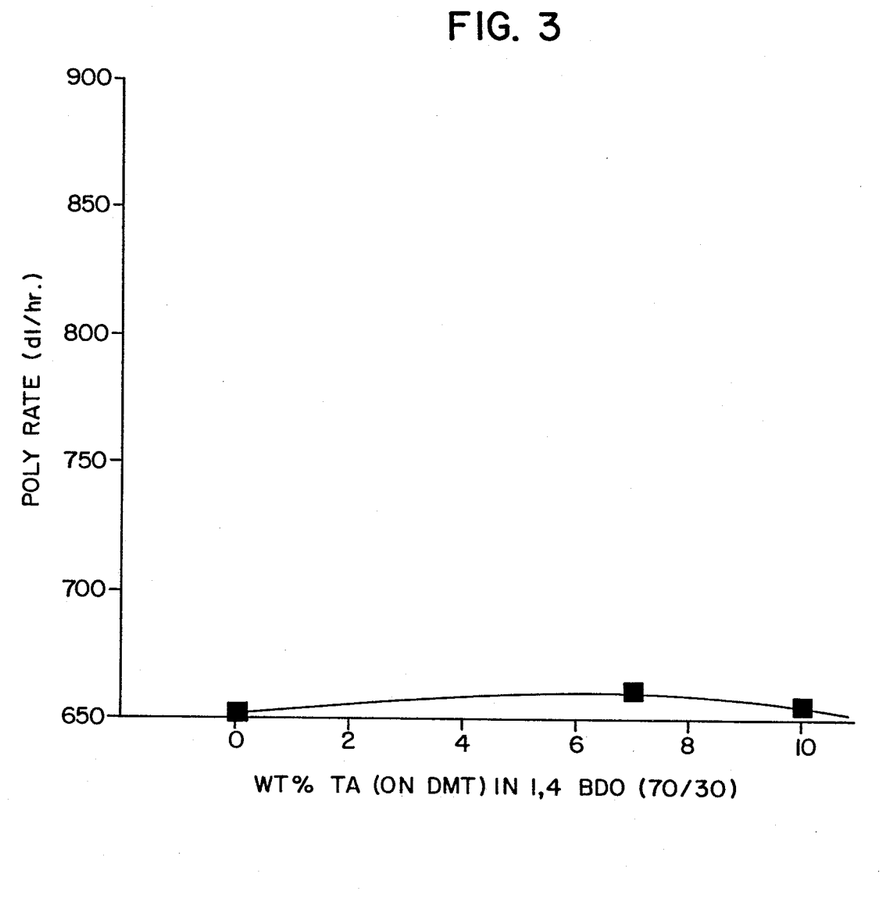
FIG. 3 is a graph plotting polymerization rate against weight percent of terephthalic acid added in 1,4-butanediol as a carrier.

A graphic representation of the data of Table 3 may be seen in FIG. 3 of the drawings wherein polymerization rate is plotted against weight percent terephthalic acid in 1,4-butanediol. As can be seen, the polymerization rate is maximized by the neat addition of terephthalic acid.

Polymer raw color data, as a function of weight percent added TA are given in Table 1. However, it is a known fact that polymer L* and b* (luminance and yellowness, respectively) are affected by IV. All other things being constant, the higher the polymer IV, the longer has been its polymerization time, which results in poorer color (reduced L* and increased b*). Because extruding polymer batches to constant IV is quite difficult, the polymers of Table 1 range from 0.80 to 0.85 IV.

EXAMPLES 9 AND 10

In order to separate the combined effects of both TA addition level and variable IV upon polymer color, two control polymers were made (using the identical conditions to those in table 1) which differed in IV, one low (Example 9) and one high (Example 10). Polymer color was measured on each and from plots of L* vs IV and b* vs IV, the effect of IV upon polymer color could be determined and quantified in terms of the slope of the line. The value of each slope can then be used to "correct" all color data of Table 1 to *constant* IV, namely to 0.85 IV.

The two examples, at low and high IV, are given in Table 4.

TABLE 4

Effect of IV Upon Polymer Color
Mole Ratio = 1.40

| Identity | Example 9 | Example 10 |
| --- | --- | --- |
| Wt. % Terephthalic Acid Added | 0 | 0 |
| IV, dl/g | 0.801 | 0.925 |
| Color: | | |
| L* | 92.0 | 90.8 |
| b* | 3.0 | 5.4 |

Thus, color correction factors, derived from the slopes of L* vs IV and b* vs IV are calculated to be:

$\Delta L^* = -0.10$ units per 0.01 unit of IV increase $\Delta b^* = +0.19$ units per 0.01 unit of IV increase When these correction factors are applied to the raw polymer data of Table 1, their color (corrected to a constant IV of 0.85) become as given in Tables 5 and 6.

TABLE 5

Table 1 L* Data Corrected to a Constant IV of 0.85

| Example | Wt % Terephthalic Acid Added | Actual IV | Actual L* | L* Corrected to 0.85 IV |
| --- | --- | --- | --- | --- |
| 1 | 0 | 0.80 | 91.9 | 91.4 |
| 2 | 5 | 0.85 | 92.5 | 92.5 |
| 3 | 9 | 0.85 | 92.0 | 92.0 |
| 4 | 10 | 0.85 | 91.6 | 91.6 |
| 5 | 12 | 0.83 | 92.2 | 92.0 |

Figure 4:
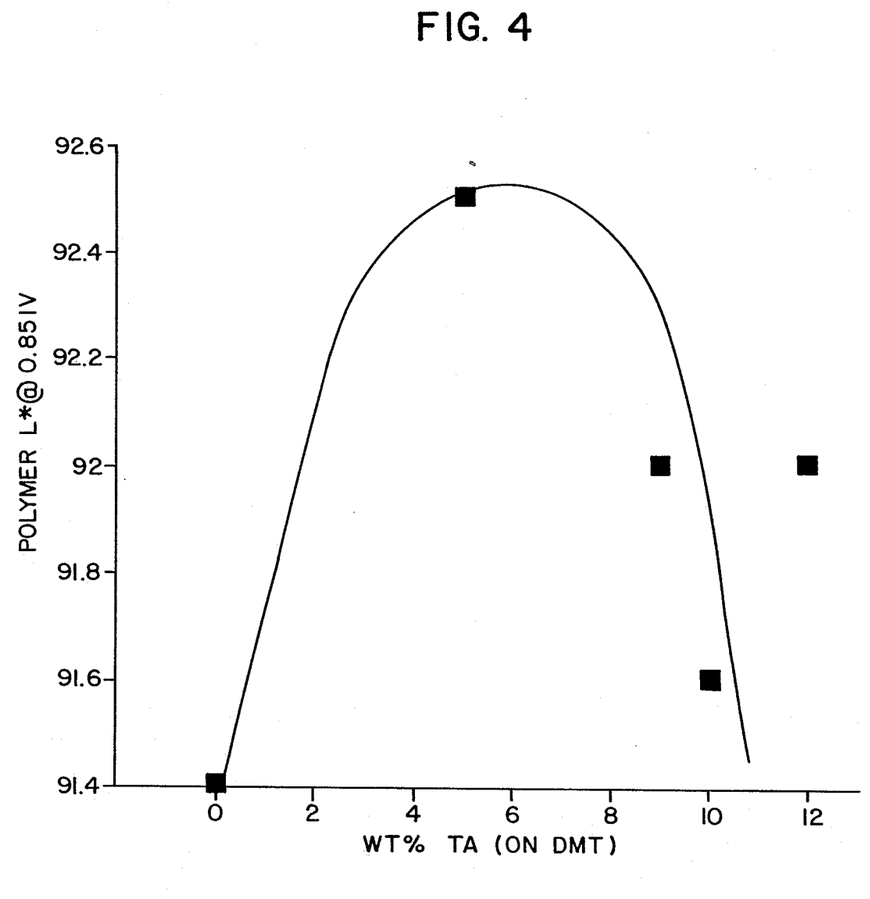
FIG. 4 is a graph plotting polymer luminance value (L*) against weight percent of terephthalic acid.

A graphic representation of the data of Table 5 may be seen in FIG. 4 of the drawings wherein polymer L* values are plotted against the weight percent of terephthalic acid added. As can be seen from the drawing, L* values increase to a maximum at about 6 weight percent of terephthalic acid and then decline rapidly.

TABLE 6

Table 1 b* Data Corrected to a Constant IV of 0.85

| Example | Wt % Terephthalic Acid Added | Actual IV | Actual b* | b* Corrected to 0.85 IV |
| --- | --- | --- | --- | --- |
| 1 | 0 | 0.80 | 3.0 | 4.0 |
| 2 | 5 | 0.85 | 2.5 | 2.5 |
| 3 | 9 | 0.85 | 3.0 | 3.0 |
| 4 | 10 | 0.85 | 3.1 | 3.1 |
| 5 | 12 | 0.83 | 1.9 | 2.3 |

Figure 5:
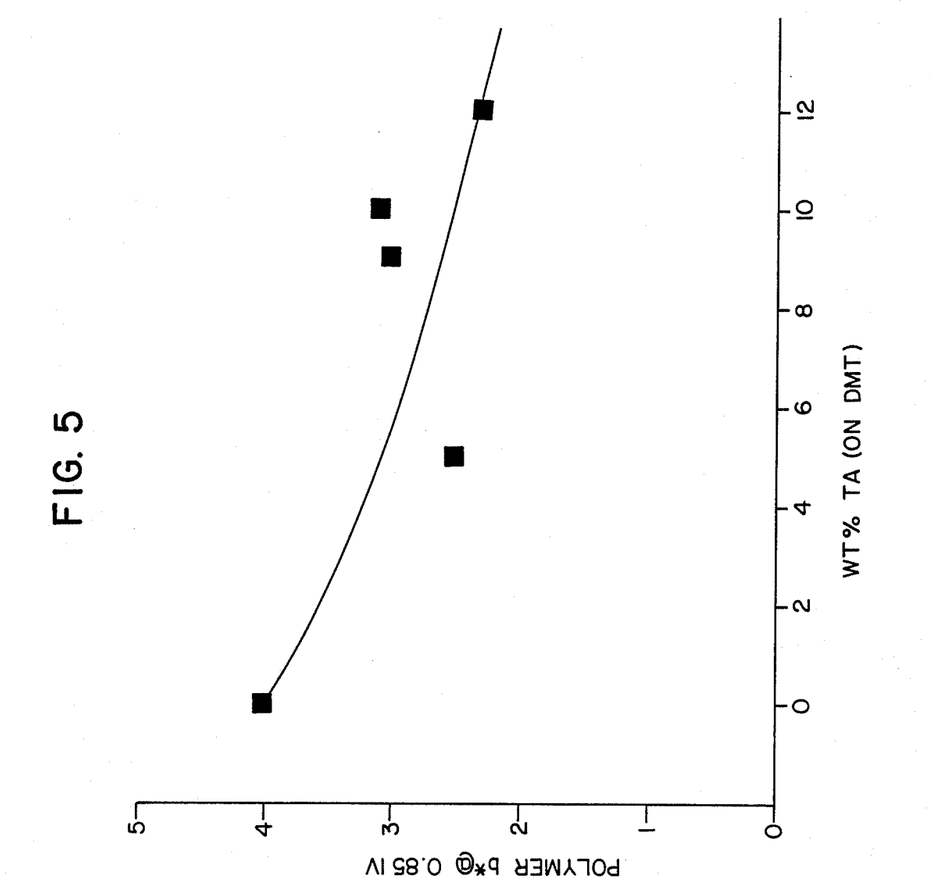
FIG. 5 is a graph plotting polymer yellow-blue values (b*) against weight percent of terephthalic acid.

A graphic representation of the data of Table 6 may be seen in FIG. 5 of the drawings wherein polymer b* values are plotted against the weight percent of terephthalic acid added. As can be seen from the drawings, b* values tend to fall as the weight percent of terephthalic acid is increased.

EXAMPLE 11

The following example is considered to be representative of the prior art and more specifically representative of Example 5 of U.S. Pat. No. 3,635,899, the example being conducted as follows: 81.5 parts of 1,4-butanediol, 100 parts of dimethyl terephthalate, and as an ester interchange catalyst 1,350 parts per million Tyzor ® TBT (registered trademark of E. I. duPont de Nemours and Co. for tetrabutyl titanate catalyst) on dimethyl terephthalate are charged to a stainless steel reactor with a thermocouple, a stirring motor, and a rectification column, thereby forming a reaction mixture wherein the diol/dimethyl terephthalate ratio is 1.4 to 1. The initial reaction temperature during polycondensation is 175° C. The ester interchange time is 1.5 hours under gradual vacuum application to 75 mm mercury, a vacuum let-down time of 45 minutes and polymerization time of 60 minutes at 250° C. The results of this example are as follows:

| | |
| --- | --- |
| Polymerization Time in Hours | 1.0 |
| IV, dl/g | 0.775 |
| Carboxyl End Groups, µeq/g | 65 |
| Color: | |
| L* | 89.4 |
| b* | 8.0 |
| Batch Mass, g | 881 |
| Poly Rate, dl/hr | 683 |

As can be seen, not only is the polymerization rate lower than that achieved by the terephthalic acid addition examples of the instant invention but also the polymer color is significantly poorer, that is to say lower L* values and higher b* values.

What is claimed is:

1. In a process for the preparation of poly(butylene terephthalate) by feeding dimethyl terephthalate and glycol components with catalysts to an ester interchange reactor and reacting components to form monomer, adding terephthalic acid on completion of the ester interchange reaction following by polymerization of the terephthalic acid containing monomer, the improvement comprising maintaining the ratio of glycol to dimethyl terephthalate in the ratio of not more than 1.3 to 1 and adding terephthalic acid neat in amounts of from 7% to 12% by weight based on the weight of dimethyl terephthalate.

2. The process of claim 1 wherein terephthalic acid is added in amounts of from 9 to 11% by weight based on the weight of dimethyl terephthalate.

3. The process of claim 1 wherein said terephthalic acid is metered into the ester interchange vessel upon completion of the ester interchange reaction.

4. The process of claim 1 wherein said process has a polymerization rate greater than 700 deciliters per hour.

5. The process of claim 1 wherein said diol is 1,4-butanediol.

6. The process of claim 1 wherein said ester interchange catalyst is of a titanium containing catalyst.

7. The process of claim 1 wherein both the ester interchange and the polymerization catalysts are titanium containing catalysts.

8. The process of claim 1 wherein said ester interchange catalyst and said polymerization catalysts are tetrabutyl titanate.

9. The process of claim 6 wherein said poly(1,4-butylene terephthalate) has L* values of more than 91.5 and b* values of less than 3 at an intrinsic viscosity of not less than 0.8.

10. The product produced by the process of claim 9.